Patented Nov. 26, 1940

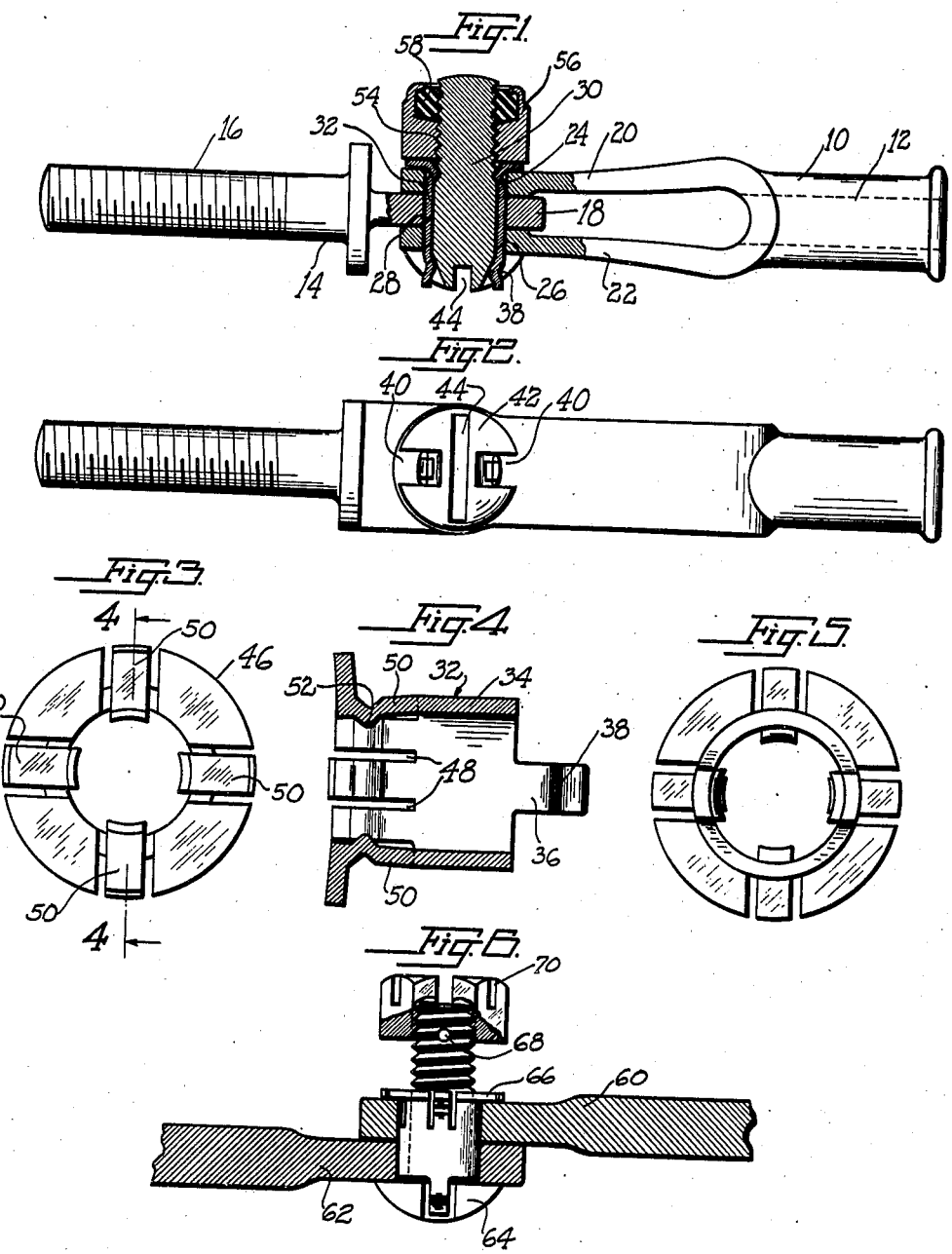

2,222,694

UNITED STATES PATENT OFFICE 2,222,694

PIVOT CONNECTION

Harold B. Thomas, Bloomfield, N. J., assignor to Elastic Stop Nut Corporation, Elizabeth, N. J., a corporation of New Jersey Application October 11, 1938, Serial No. 234,417

12 Claims. (Cl. 287—100)

The present invention relates to pivot connections and has particular reference to pivot connections of the so-called clevis type. In many instances such pivot connections are of vital importance, as for instance when they are used for attaching control wires to the rudders or elevators of aircraft, and the failure of any such connection may mean complete loss of control of the aircraft. With the usual type of construction in which the pivot bolt is held in place by a cotter pin, or by a castellated nut which is in turn kept from backing off the bolt by a cotter pin, instances of failure can and have occurred because of many different reasons. Breakage of the bolt itself is not an uncommon occurrence, such breakage usually occurring immediately adjacent to the head of the bolt. Also the bolt may become stuck or frozen in one or another of the pivoted members so that it and the nut rotate with respect to the surface of the pivoted member with which the bottom face of the nut is in contact. The general tendency of such relative movement is to work the nut off the bolt and in some cases this tendency may be sufficiently great eventually to shear the cotter pin, which is ordinarily of mild steel. Also, the usual commercial grade of cotter pin is not an entirely reliable article since cotter pins are manufactured in great quantities at very low cost and are not ordinarily subject to close inspection so that comparatively frequently they have defects which result in breakage in service so that the nut is free to work off the bolt due to vibration or other causes.

The general object of the present invention is to provide new and improved pivot structure which will eliminate the dangers of failure of the pivoted connection inherent in the usual type of connection above described.

This and other and more detailed objects of the invention, the manner in which they are obtained and the advantages to be derived from use of the invention may best be understood from consideration of the ensuing portion of this specification, taken in conjunction with the accompanying drawing illustrative of suitable forms of structure for carrying the invention into effect.

In the drawing: Fig. 1 is a plan view partly in section of a pivot connection embodying the invention.

Fig. 2 is a view of the structure shown in Fig. 1 looking from beneath Fig. 1.

Fig. 3 is an end view on enlarged scale of one of the elements of the structure shown in Fig. 1.

Fig. 4 is a section taken on the lines 4—4 of Fig. 3.

Fig. 5 is a view of the element shown in Fig. 3 looking at the opposite end thereof; and Fig. 6 is a section showing another form of pivot connection embodying the invention.

Referring now particularly to Figs. 1 to 5, the structure illustrated constitutes a clevis connection formed by a yoke member 10 having a suitably threaded socket portion 12 for the reception of a control rod, cable or the like (not shown) and a pivot member 14 having a threaded shank 16 and a knife portion 18 extending between the prongs or arms 20 and 22 of the yoke member 10.

The arms 20 and 22 of the yoke member are provided with the usual aligned bores 24 and 26 and the portion 18 of the pivot member is provided with a bore 28 of like diameter.

In accordance with the present invention the pivot bolt 30, instead of seating directly in the openings of the members connected thereby is separated therefrom by a sleeve indicated generally at 32, which is shown more in detail in Figs. 3 to 5. Sleeve 32 comprises a cylindrical portion 34 the outer diameter of which is advantageously such as to make the sleeve a smooth fit in the bores of the pivoted members.

At one end of the cylindrical portion, one or more (in the present instance two diametrically opposed) fingers 36 are formed. Fingers 36 are indented to provide detents shown at 38 and as will be seen from Figs. 1 and 2, these fingers are adapted to engage the bottom surfaces of suitable slots or recesses 40 formed in the head of the bolt. In the embodiment illustrated the bolt is provided with a screw type head 42 having the usual slot 44 therein for the reception of a screw driver, but it will be evident that any desired type or shape of bolt head may be employed in so far as the present invention is concerned.

The end of the sleeve opposite fingers 38 is flanged as indicated at 46 and the part of the cylindrical portion of the sleeve adjacent to the flanged end is slotted as at 48 to provide one or more fingers 50, four such fingers being illustrated in the form shown. The fingers 50 adjacent to the flanged portions thereof are inwardly bent or indented to provide detents 52 for engaging a suitably recessed part of the shank of the bolt, which conveniently may be that between adjacent turns of the bolt thread 54, as shown.

Sleeve 32 is advantageously made of a suitable quality of metal providing resiliency for the fingers and the internal diameter of the sleeve is advantageously such that it will pass over the shank of the bolt with a comparatively snug sliding fit.

The manner of assembly of the pivot connection will be largely evident from Fig. 1, the sleeve is first inserted through the bores in the pivoted members with the flanged portion in contact with one of the members and with the fingers 38 projecting from the opposite side of the assembly. With the sleeve inserted the bolt is passed through the sleeve and as will be evident from the drawing the fingers 38 grip the bolt head while the fingers 50 grip the bolt thread at the opposite side of the connection.

The assembly is finally completed by screwing a nut 56 on the projecting threaded end of the bolt and this nut is advantageously of self-locking type, the form illustrated being of the type commercially known as an "Elastic stop nut" which is provided with a locking insert 58 of suitable non-metallic and elastic material such as vulcanized fibre which serves to grip the bolt and prevent the nut from backing off, in accordance with the principles set forth in U. S. Patent 1,550,282, granted to T. G. Rennerfelt.

The construction illustrated affords many practical advantages, particularly from the safety standpoint, the most important of which may be pointed out as follows:

The sleeve, when assembled with the bolt, even in the absence of the nut screwed on the bolt, constitutes retaining means for preventing the pivot bolt from falling out which is sufficiently effective to be satisfactory as an emergency holding means, although the fact that in the absence of the nut the bolt can be snapped out of place with respect to the sleeve, makes of the sleeve a retaining means which it is preferred be not relied upon alone for permanent retention of the bolt in its place.

Further, because of the fact that the detents on the sleeve engage the bolt at opposite sides of the connection and at one of the sides engage the head portion of the bolt, the sleeve will act as a suitable emergency retaining member for retaining the parts of the bolt in place in the event the bolt should break in service, such breaking as hereinbefore pointed out usually occurring in the shank closely adjacent to the head. If the connection is subjected to substantial tension or compression forces, resulting in shear stress on the sleeve, the sleeve can readily transmit the forces applied even though it be made of comparatively thin metal, since the shank of the bolt forms a backing for the sleeve preventing any appreciable distortion thereof and this backing is retained even if the bolt is broken.

The above advantages are inherent in the bolt and sleeve assembly and evidently are effective regardless of the presence or absence of the nut.

As will be evident from the drawing, the fingers which fit into the slots in the bolt head serve to prevent rotation of the bolt with respect to the sleeve. This is important in preventing the connection at any time from freezing in a manner which will tend to produce relative rotational movement between the nut and the surface against which it is screwed. As will be seen from the drawing, the nut seats against the flange on the sleeve. Normally, in a clevis connection of the kind shown in Fig. 1 the friction between the bolt head and one arm of the yoke member and between the flange on the sleeve and the other arm of the yoke member will tend to fix the sleeve and bolt assembly rotationally with respect to the yoke member, pivotal movement occurring between the sleeve and the pivot member which is received between the arms of the yoke member. Even if this is not the case and the sleeve becomes frozen to the center member so that it and the bolt have rotational movement with respect to the arms of the yoke member, there is still no rotational movement of the nut relative to the sleeve flange against which it seats and consequently there can at no time be any tendency for any motion of the pivotally connected parts relative to each other to cause the nut to back off.

Self-locking nuts of the kind shown in Fig. 1 have been proven by experience to be free from any liability to back off a threaded bolt due to vibration, but such nuts are intended to be readily removable by the application of steady turning pressure as applied by a wrench or the like. In the usual pivot bolt construction a nut of this type might be caused to back off, to some extent at least, if the pivot bolt froze in one of the pivoted members so that it and the bolt might turn relative to the member against which the nut seated. The present form of construction consequently is particularly advantageous for use with self-locking nuts of the type described, which in turn are advantageous because of the possibility of eliminating cotter pin holes in bolts and cotter pins.

As will readily be understood, the invention is applicable to many different kinds and types of pivoted connections and in Fig. 6 another form of connection is shown in which two plain rods or the like 60 and 62 are pivotally connected by means of bolt 64 and sleeve 66, the construction and assembly of which is like that previously described. In the present embodiment, the bolt is shown provided with a cotter pin hole 68 adapted to receive a cotter pin passing through the slots in a castellated nut 70 of usual form, which as previously noted may be used but which is considered to be less desirable than the self-locking type nut illustrated in Fig. 1.

It will be evident to those skilled in the art that many changes and modifications in the specific design of the parts hereinbefore described by way of illustration may be made without departing from the spirit and scope of the invention, which is to be understood as embracing all forms of construction falling within the terms of the appended claims.

I claim:

1. A pivot connection for pivotally connecting at least two parts having aligned openings therein, comprising a sleeve passing through said openings, a bolt passing through said sleeve and having a head, and means forming a part of said sleeve for releasably gripping the head of the bolt and the shank of the bolt at opposite sides of said connection to hold the bolt and sleeve in assembled relation and to prevent accidental displacement of either from the assembly.

2. A pivot connection comprising at least two members having aligned openings therein, comprising a sleeve extending through said openings and having one or more resilient detents at one end thereof for engagement with a bolt head and a bolt passing through said sleeve and having a head formed with cooperating surface adapted to be engaged by said detents for holding the bolt against rotation in said sleeve.

3. A pivot connection for pivotally connecting a plurality of members having aligned openings therein forming a bore, comprising a sleeve having a flanged end, said sleeve being inserted in said bore from one side of said connection, a bolt passing through said sleeve and having a head at the side of the connection opposite the sleeve flange and means constituting a part of said sleeve for releasably holding said bolt against axial displacement with respect to said sleeve.

4. A pivot connection for pivotally connecting two members having aligned openings therein providing a bore, comprising a sleeve in said bore, a flange at one end of the sleeve engaging one of said members, a bolt passing through said sleeve and having a head at the side of the connection opposite said sleeve and detents formed at the end of the sleeve opposite the flanged end thereof, said detents engaging the bolt head to prevent both axial displacement and rotation of the bolt with respect to the sleeve, the bolt head and the detents engaged therewith serving to prevent axial displacement of the sleeve from said bore.

5. For use in pivot connections, a bolt having a head and a shank, and a sleeve fitting the shank portion of the bolt, said sleeve having detents at one end formed to resiliently and releasably engage the head of the bolt to prevent axial displacement of the sleeve with respect to the bolt and the opposite end of said sleeve being provided with detents adapted to engage a cooperating recessed portion of the bolt shank.

6. As a new article of manufacture for use with pivot bolts, a sleeve adapted to be assembled over the bolt shank adjacent to the head of the bolt, said sleeve having a plurality of spring fingers projecting from one end thereof to releasably engage the head of the bolt and being outwardly flanged at its opposite end, the flanged end of the sleeve being slotted to provide a plurality of axially extending fingers and said fingers being formed to provide detents adapted to engage a recessed portion of the bolt shank when the sleeve is in assembled position.

7. For use in pivot connections, a sleeve member adapted to be assembled over the shank of a headed bolt, said sleeve member including means adapted to engage the bolt to prevent turning of the bolt and sleeve relative to each other and the end of the sleeve remote from the bolt head being flanged to provide a seating surface for a nut threaded on the bolt.

8. For use in pivot connections, a metal sleeve member adapted to be assembled over the shank of a headed bolt and to provide a bushing for the parts to be pivotally connected, said sleeve member having resilient finger-like detents at one end thereof adapted to releasably engage the bolt head to prevent turning of the bolt and sleeve relative to each other, and said sleeve having a plurality of resilient fingers at its opposite end adapted to releasably engage the bolt shank to prevent axial displacement of the bolt and sleeve relative to each other.

9. For use in pivot connections, a metal sleeve member adapted to be assembled over the shank of a headed bolt and to provide a bushing for the parts to be pivotally connected, said sleeve member having resilient finger-like detents at one end thereof adapted to releasably engage the bolt head to prevent turning of the bolt and sleeve relative to each other, and said sleeve having a plurality of resilient fingers at its opposite end, said fingers being turned outwardly at their free ends to provide a flange-like end for the sleeve adapted to abut against one of the members to be connected, and said fingers further being provided with detent portions adapted to be forced inwardly against the bolt shank to grip the same by a nut screwed on the bolt to clamp the outer ends of the fingers between said one of said members and the nut.

10. For use in pivot connections, a bolt having a head and a threaded shank, a sleeve member around the portion of the shank adjacent to the bolt head and releasably engaging the head of the bolt to prevent the sleeve from turning with respect to the bolt, the end of the sleeve remote from the head of the bolt being turned outwardly to provide a seat, and a self-locking nut comprising an elastic insert frictionally engaging the bolt thread and adapted to engage said seat.

11. A pivot connection for a clevis having a yoke member providing spaced arms with aligned bores therethrough and a second member adapted to be pivotally connected between said arms, comprising a sleeve member adapted to extend through said bores and having a flange portion at one end adapted to bear against the outer face of one of said arms, a bolt passing through said sleeve having a head adapted to bear against the outer face of the other of said arms and a threaded shank portion projecting past the flange portion of said sleeve, said head and the end portion of the sleeve remote from the flange portion being formed to provide a releasable connection between the parts for preventing the sleeve and bolt from turning relative to each other, and a frictionally self-locking nut threaded on the projecting portion of the bolt shank and seating against the flange portion of the sleeve, the intermediate portion of said sleeve providing a journal for pivotally mounting said second member.

12. A pivot connection for a clevis having a yoke member providing spaced arms having aligned bores therethrough and a second member adapted to be pivotally connected between said arms, comprising a sleeve member extending through said bores and having a flange portion at one end adapted to bear against the outer face of one of said arms, a bolt passing through said sleeve having a head adapted to bear against the outer face of the other of said arms and a threaded shank portion projecting past the flange portion of said sleeve, said head and the end portion of the sleeve remote from the flange portion being formed to provide a resilient releasable connection between the parts for preventing turning movement and axial displacement of the bolt relative to the sleeve member and said sleeve member further being provided with means for releasably engaging the bolt shank at a place spaced from the bolt head to independently prevent axial displacement of the bolt relative to the sleeve, and a frictionally self-locking nut threaded on the projecting portion of the bolt shank and seated against the flange portion of the sleeve member, the intermediate portion of said sleeve providing a journal for pivotally mounting said second member.

HAROLD B. THOMAS.